US006615970B1

(12) United States Patent
Billington et al.

(10) Patent No.: US 6,615,970 B1
(45) Date of Patent: Sep. 9, 2003

(54) CURRENCY HANDING APPARATUS

(75) Inventors: Gregory John Billington, Reading (GB); Andrew Mark Smith, Bracknell (GB)

(73) Assignee: Mars Inc., McLean, VA (US)

( * ) Notice: Subject to any disclaimer, the term of this patent is extended or adjusted under 35 U.S.C. 154(b) by 0 days.

(21) Appl. No.: 09/544,154

(22) Filed: Apr. 6, 2000

(30) Foreign Application Priority Data

Apr. 7, 1999 (GB) ............................................ 9907952

(51) Int. Cl.$^7$ ............................................... G06F 19/00
(52) U.S. Cl. ....................................... 194/216; 194/217
(58) Field of Search ................................ 194/200, 216, 194/217

(56) References Cited

U.S. PATENT DOCUMENTS 4,383,210 A * 5/1983 Wilkinson ............. 194/216 X
4,604,557 A * 8/1986 Cowles .................. 194/216 X
4,848,556 A 7/1989 Shah et al. ................ 194/212
5,109,972 A 5/1992 Van Horn et al. .......... 194/217
5,564,547 A * 10/1996 Ranon et al. ............... 194/216
6,053,299 A * 4/2000 Rollins ....................... 194/217

FOREIGN PATENT DOCUMENTS

FR 2 355 418 6/1977
GB 2 246 989 A 2/1992
WO WO 92/09057 5/1992

* cited by examiner

*Primary Examiner*—James R. Bidwell
(74) *Attorney, Agent, or Firm*—Fish & Richardson P.C.

(57) ABSTRACT

Cash handling apparatus comprising a power input and a money transport system for moving items of money in a normal operating mode, with a power control system for detecting a probable reduced supply power level and, in dependence thereon, for selecting a reduced power mode in which the money transport system continues to function for future transactions, whilst the apparatus draws a lower power from the power input.

20 Claims, 9 Drawing Sheets

CURRENCY HANDING APPARATUS

This invention relates to apparatus for handling units of currency. The invention will be described mainly in the context of coin handling, but is also applicable to apparatus which also or alternatively handles other units of currency, such as banknotes or the like.

It is known to provide a coin handling apparatus which receives and validates coins of different denominations, and directs valid coins to respective containers each containing coins of a single denomination. It is also known to dispense coins from these containers as change in an amount corresponding to the difference between the value of inserted coins and the price of a product or service obtained from a machine associated with the coin handling apparatus.

Such coin handling apparatus is typically provided in vending machines or payphones, which are required to operate unattended for long periods of time. Typically, power is supplied to the coin handling apparatus from the machine within which it is located, although some currency handling apparatus has mains supply ports.

In either case, the voltage supplied to the apparatus (and hence the power available to it) may differ from the voltage level it requires for normal operation. For example, European mains power nominal supply levels vary at present between 240–220 volts, and may in future be set with a relatively wide tolerance. Thus, the voltage may vary according to the location of the apparatus. Equally, the voltage may vary over time, since in some areas voltages are reduced at peak usage periods.

It may be dangerous for a currency handling apparatus to operate at an inadequate power level. For example, the operation of the currency receiving and accepting system, or of the currency dispensing system, may cause jams if inadequate power is available to operate the electro mechanical actuators (solenoids or motors) required. Such jams are costly, and may cause significant loss of revenue if the apparatus is put out of action.

It would be possible to detect an unacceptably low power supply level and suspend operation of the apparatus until power returned. However, whilst this would prevent jams, it would be ineffective in reducing lost revenue, and in dealing with geographical voltage variations.

At this point, it may be mentioned that various techniques are known for preventing jams on power loss; for example, our earlier British patent GB 2246898 discloses a coin validator which has an auxiliary power supply (for example a capacitor) with sufficient power to keep the coin acceptor gate in operation, when power is lost, until any coins in the validator have passed through the gate.

Similarly, FR 2355418 discloses a coin operated telephone with a non-volatile credit memory, with a capacitor which may also supply energy to a rocker within a coin refund mechanism, in the event of power failure.

Furthermore, our earlier application U.S. Pat. No. 4,979,208 shows a coin mechanism for a payphone in which a low power mode is provided for open switch intervals, during which machine operating parameters are saved in a capacitor-backed memory to enable operation to resume after the end of the open switch interval. During the interval, however, operation of the mechanism is interrupted.

Alternative techniques attempt to reduce the overall power consumed by a currency handling apparatus, for example to enable it to be used with a battery or to be powered from a telephone line. Examples are the use of arrival sensors to power up the mechanism only on arrival of a coin, as described in our earlier applications GB 2094008 and EP 0184393.

A vending machine which reduces average power used by, for example, its heating and cooling devices during periods of the day when an office is closed (which do not apparently coincide with reduced supply power conditions) is disclosed in U.S. Pat. No. 5,868,274.

By way of contrast, the present invention provides a currency handling apparatus which can sense the probable occurrence of a reduced power condition, and which can, in response, continue to operate in a selected reduced power mode, in which its currency handling functions are still performed.

In an implementation, it is the power during periods of peak power use by the apparatus, rather than the long-term average power, which is reduced in such modes.

For example, the reduced power mode may provide one or more modes of operating a currency dispensing subsystem at reduced power. Where a plurality of actuators (e.g. motors) are normally employed simultaneously for dispensing, in the reduced power mode they may sequentially be activated instead. Further, power to peripheral devices not directly concerned with the transport or handling of currency (such as displays) may be reduced or interrupted, either during a currency handling operation or permanently.

Where a reservoir (such as a capacitor) of power is provided, which may be recharged from the external power supply, then the reduced power mode may involve the provision of a predetermined delay between successive operations of power-consuming components, the delay being sufficient to permit at least some substantial re-charging of the reservoir.

For example, a delay may be provided between successive operations of electro mechanical currency handling actuators (such as solenoids driving the accept gate and separator gates of a currency acceptor, and/or the dispense motors or dispense solenoids of a change dispenser). A delay may be provided between successive actuations of the same device, or between successive actions of any such device.

At this point it may be mentioned that the control of the duration of the period between successive operations of a coin accept gate is disclosed, for a very different purpose, in GB 2137793.

Other aspects and preferred embodiments of the invention, with corresponding advantages, will be apparent from the following description and claims.

An example of an apparatus in accordance with the invention will now be described with reference to the accompanying drawings, in which.

Figure 1:
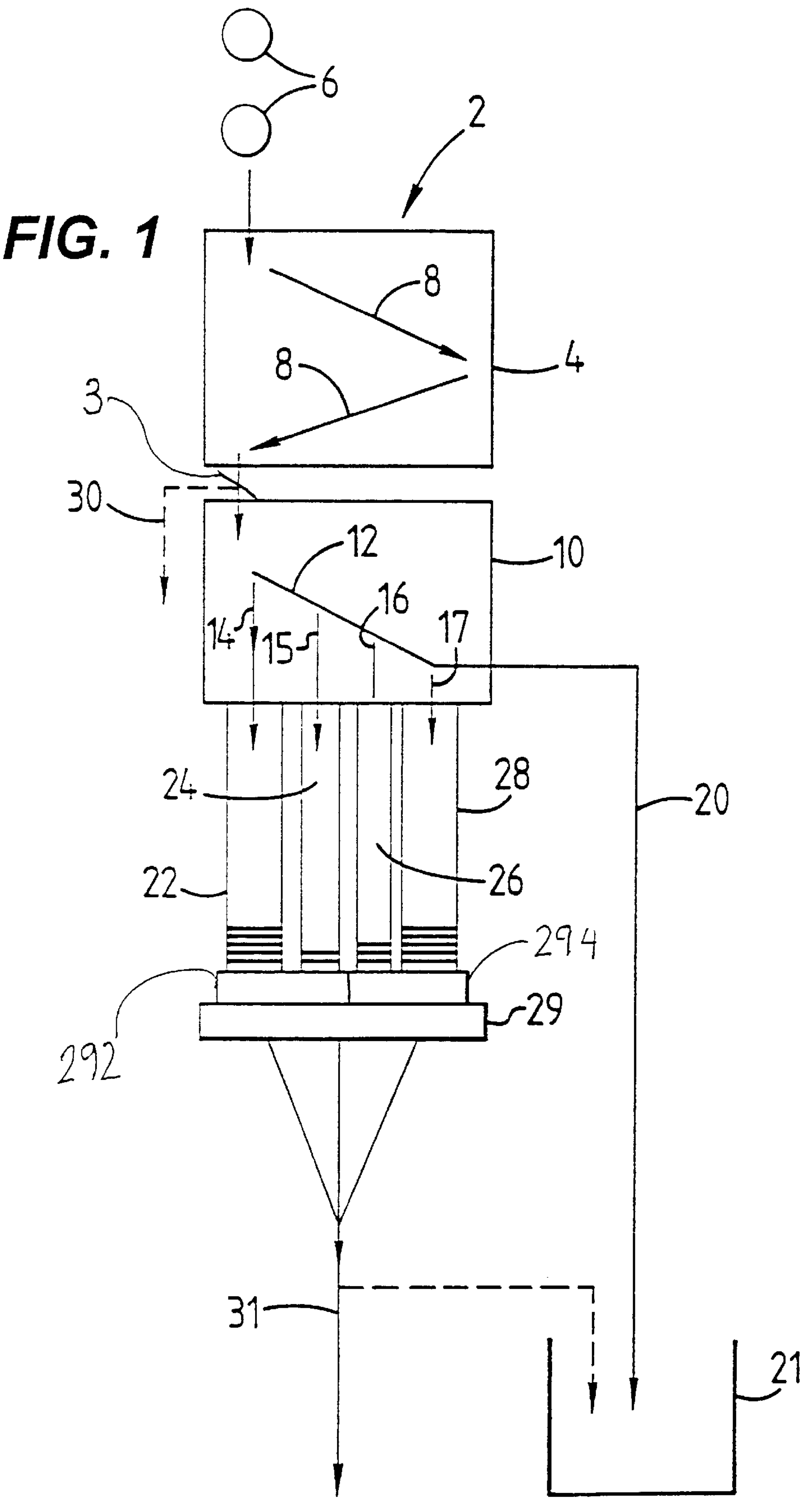
FIG. 1 is a schematic diagram of the mechanical part of a coin handling apparatus.

Referring to FIG. 1, the coin handling apparatus 2 in the vending machine includes a coin validator 4 for receiving coins as indicated at 6. During the passage of the coins 6 along a path 8 in the validator 4, the validator provides signals indicating whether the coins are acceptable, and if so the denomination of the coins. Various types of validators are known, including validators using optical, acoustic and inductive techniques. Examples of such validators are described in, amongst others, GB 1397083, GB 1443934, GB 2254948, GB 2094008 and GB 2288266, the contents of which documents are incorporated herein by reference.

Acceptable coins then enter a coin separator 10, which has a number of gates 5, 7, 9, 11 (not shown) actuated by respective solenoids 205, 207, 209, 211 controlled by the circuitry of the apparatus for selectively diverting the coins from a main path 12 into any of a number of further paths 14, 15, 16 and 17, or allowing the coins to proceed along the path 12 to a path 20 leading to a cashbox 21. If the coins are unacceptable, instead of entering the separator 10 they are diverted straight to a reject slot via a path 30, by an accept gate 3 driven by an actuating solenoid 203.

Each of the paths 14, 15, 16 and 17 leads to a respective one of four coin tubes or containers 22, 24 and 26 and 28. Each of these containers is arranged to store a vertical stack of coins of a particular denomination. Although only four containers are shown, any number may be provided.

A dispenser indicated schematically at 29 is operable to dispense coins from the containers when change is to be given by the apparatus. The dispensed coins are delivered to a refund path 31.

The dispenser comprises a pair of motors 292, 294 each able to dispense a coin from one of two tubes (22, 24; or 26, 28) beneath which it is located, on energising of selected windings by the circuitry of the apparatus.

The tubes 22, 24, 26, 28 are provided in a removable cassette, and the tubes themselves are removable from the cassette, as described in GB 2 246 897 A, the contents of which are incorporated herein by reference.

Figure 2:
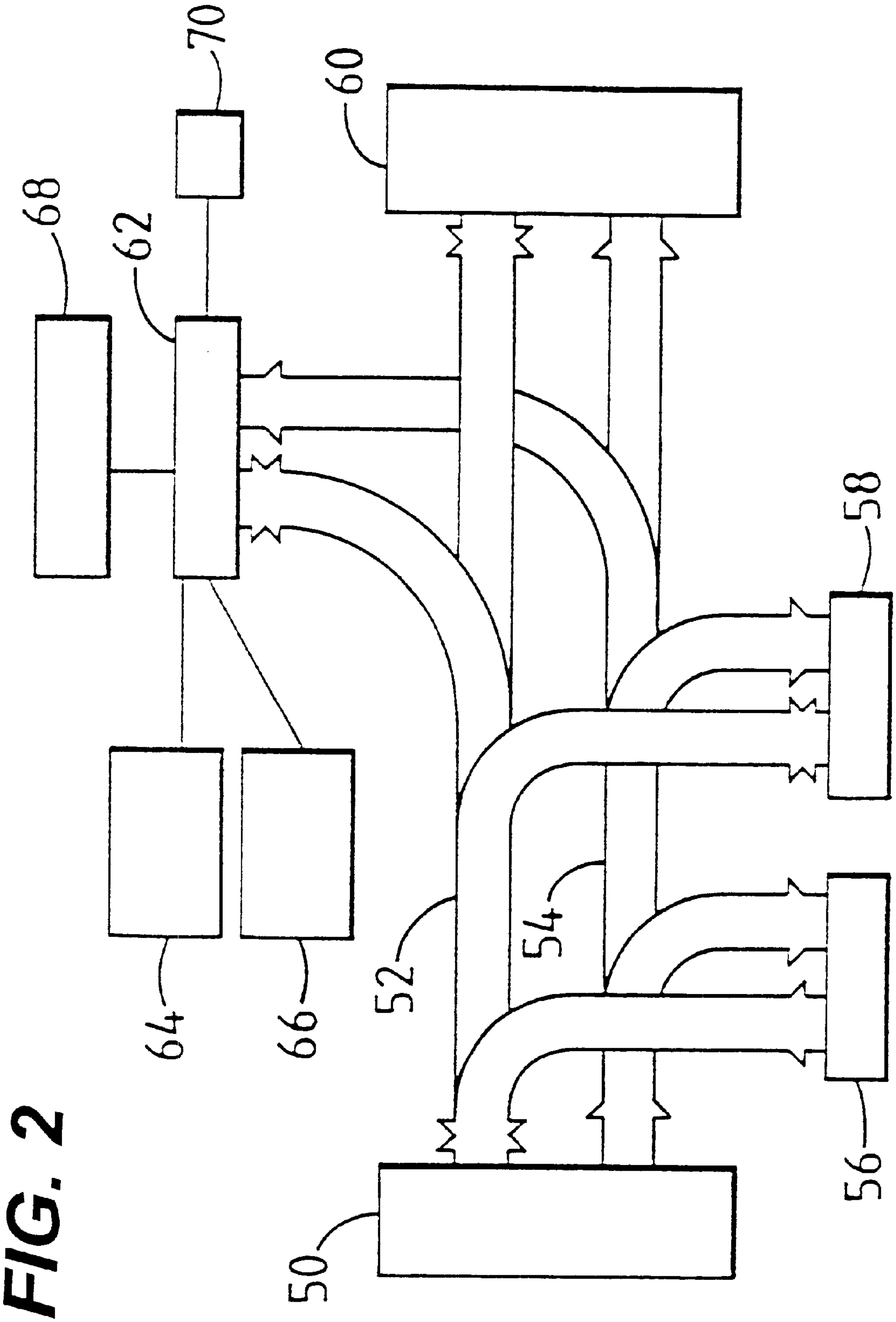
FIG. 2 is a block diagram of the circuit of the coin handling apparatus.

Referring to FIG. 2, the circuit of the present embodiment of the invention incorporates a microprocessor 50 connected to data and address buses 52 and 54. Although separate buses are shown, data and address signals could instead be multiplexed on a single bus. A bus for control signals could also be provided. An LSI could replace the microprocessor.

The microprocessor 50 is connected via the buses 52 and 54 to a read-only memory (ROM) 56 and a random access memory (RAM) 58. The ROM 56 stores the program controlling the overall operation of the microprocessor 50, and the RAM 58 is used by the microprocessor 50 as a scratch-pad memory.

The microprocessor 50, the ROM 56 and the RAM 58 are, in the described implementation, combined on a single integrated circuit.

The microprocessor 50 may also be connected via the buses 52 and 54 to an Electrically Alterable ROM (EAROM) such as a Flash memory, 60, for storing a variety of alterable parameters.

The microprocessor 50 is also coupled via the buses 52 and 54 to input/output circuitry indicated at 62. The circuitry

62 includes user-operable switches, at least one level sensor for each of the coin containers 22, 24, 26, 28, circuits for operating the dispenser 29 and the gates of the coin separator 10, the circuitry of the coin validator 4, and a credit display 63 visible to a user of the apparatus for displaying an accumulated credit value and an indication when insufficient coins are stored to guarantee that change will be available. The circuitry 62 is connected to a display 68 visible to the operator, and to a keypad 70 accessible only to the operator.

The input/output circuitry 62 also includes an interface 72 between the control circuit of the apparatus and a vending machine circuit board 64 to which it is connected, and a further interface to an audit device 66.

In operation of the apparatus the microprocessor 50 successively tests the signals from the validator to determine whether a coin has been inserted in the apparatus. When a credit has been accumulated, the microprocessor also tests signals from the vending machine to determine whether a vending operation has been carried out. In response to various signals received by the microprocessor 50, various parts of the program stored in the ROM 56 are carried out. The microprocessor is thus arranged to operate and receive signals from the level sensors of the coin containers 22, 24, 26, 28, and to control the accept gate and the gates in the separator 10 in order to deliver the coins to the required locations. and is also operable to cause appropriate information to be shown on the displays of the apparatus and to deliver signals to the vending machine to permit or prevent vending operations typically through vendor price relays. The microprocessor is also operable to control the dispenser to deliver appropriate amounts of change.

The arrangement so far is quite conventional, and the details of particular structures suitable for use as various parts of the mechanism will therefore not be described in detail.

The particular sequence of most of the operations carried out by the microprocessor may be the same as in previous apparatus. A suitable program to be stored in the ROM 56 can therefore be designed by anyone familiar with the art, and accordingly only the operations carried out by the particularly relevant parts of this program will be described.

Figure 3:
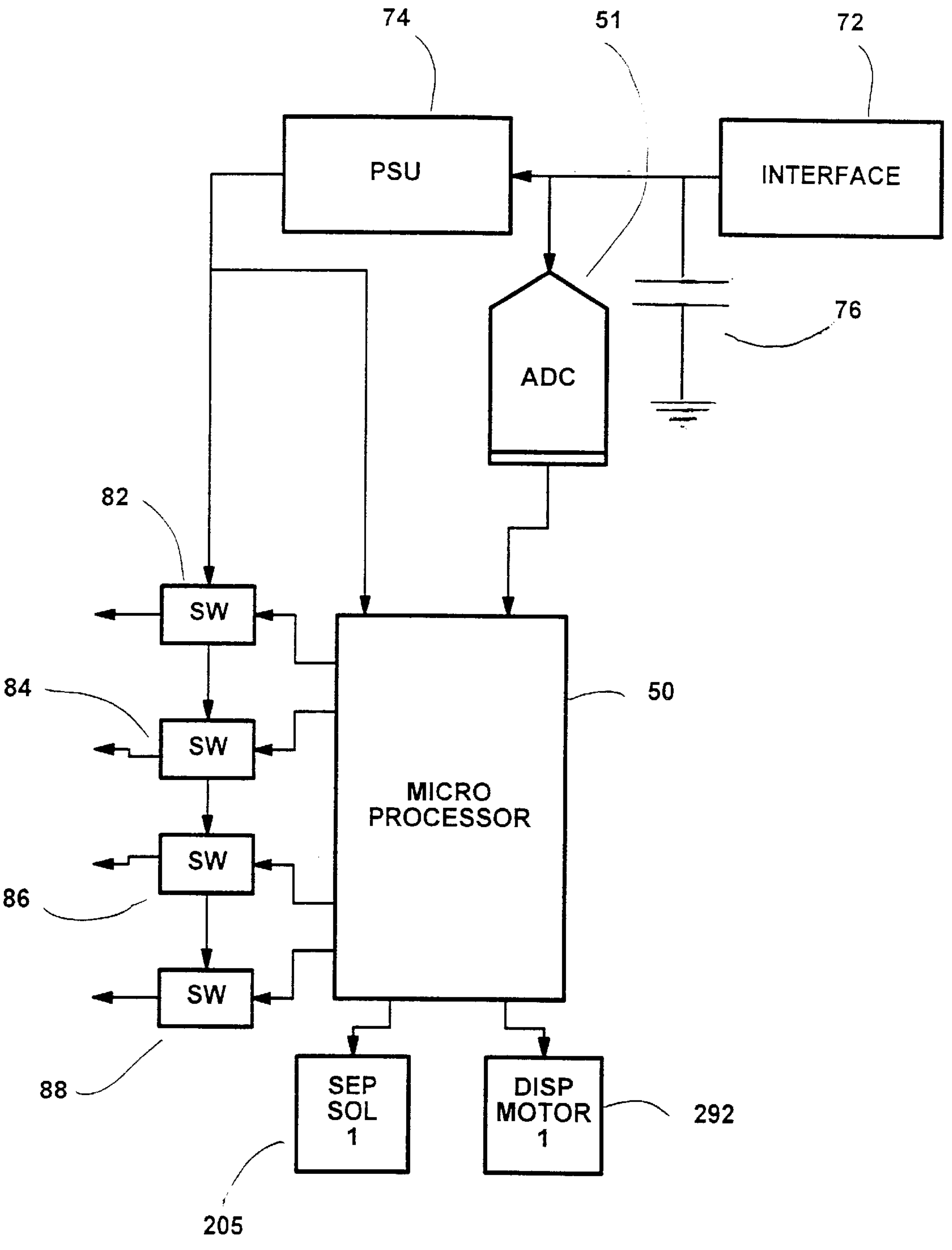
FIG. 3 is a block diagram showing the power control subsystem of the apparatus of FIGS. 1 and 2.

FIG. 3 illustrates the power supply arrangements. The interface 72 to the vending machine includes a power supply line (and, where necessary, an earth line) carrying, for example, low voltage DC. The interface may be configured to accept a Multi-Drop Bus (MDB) connector, an electromechanical vending machine connector, or both, as well as other possible interfaces which supply power.

The power line from the interface is routed to a power supply unit 74, performs any necessary smoothing and voltage step-down. Between the power line from the interface 72 and ground is a capacitor 76. Under ordinary conditions, the capacitor is therefore held at the line voltage of the power line from the interface. The output of the power supply unit 74 appears on a power bus line supplied to components of the apparatus.

When the apparatus of FIG. 1 operates power consuming components (such as the dispense motors 292, 294), the charge stored on the capacitor 76 provides additional supply current, for a predetermined period of time related to the capacitance of the capacitor. It is then subsequently recharged from the power supply line from the interface 72. The time taken to recharge may be, for example, 100–200 ms.

In normal operation, when a coin is received, if it is a valid coin the accept gate 3 is energised to route it to the separator 10, by the acceptor gate solenoid 203, and the selected separator gate is actuated by its solenoid to allow the coin to pass to the desired coin tube. The gate and the selector solenoids are energised for a period of time sufficient to guarantee that the coin passes completely through; they are typically energised together.

The microprocessor 50 also controls the supply of power to electromechanical components such as the dispenser motors 292 and 294, and separator solenoids (for example 205 as shown). Finally, the microprocessor 50 controls the supply of power to a plurality of relays (such as the relay for the exact change light, and vend relays), display devices, and other input/output devices, via respective switches 82–88. Thus, the microprocessor 50 is able to prevent the supply of power from the power bus to the windings of relays or other output devices where this is not necessary.

Figure 4:
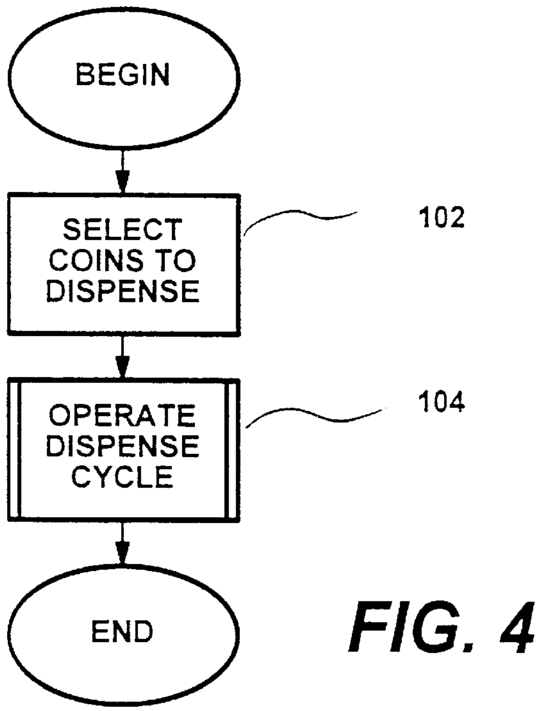
FIG. 4 is a flow diagram showing the overall order of dispensing operations in the apparatus.

On dispensing, as indicated in FIG. 4, at step 102, the coins to be dispensed are selected (for example as disclosed in GB 2284090) and in step 104, a dispense cycle operates to dispense the selected coin or coins.

Figure 5:
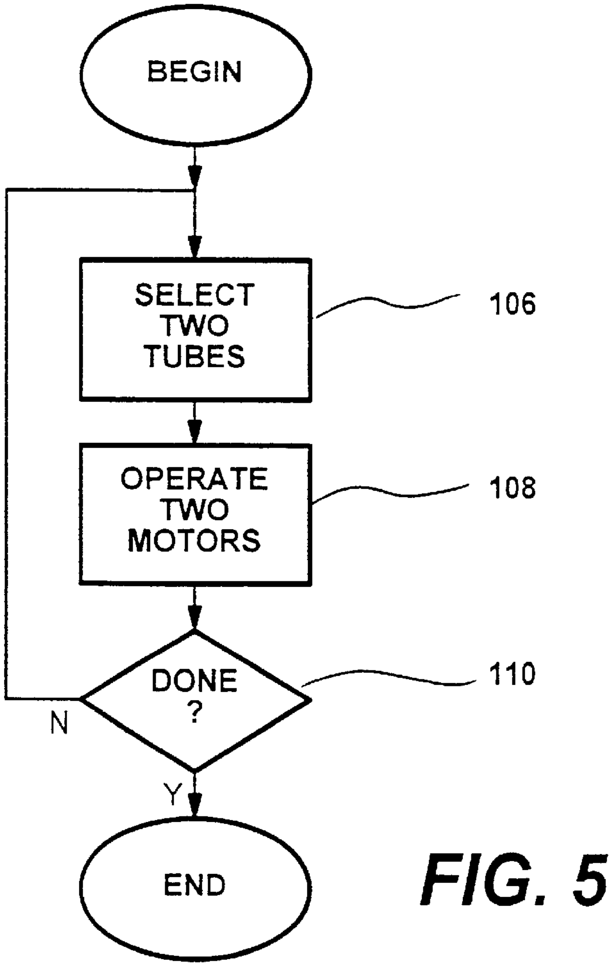
FIG. 5 is a flow diagram showing the operation of the apparatus in a normal power dispensing mode.

The normal dispense cycle is shown in FIG. 5. Where the coins to be dispensed are in separate tubes, greater dispensing speed is achieved by simultaneously dispensing from two tubes.

Accordingly, in a step 106, two tubes containing coins selected from those to be dispensed are selected, and in step 108 the two motors 292, 294 are operated simultaneously to dispense a coin from each tube. In step 110. it is determined whether further coins remain to be dispensed and, if so, step 106 is repeated.

At the same time, whilst coins are being accumulated, the credit accumulated is displayed on the display 63. Further, depending on the type of device (for example vending machine) with which the apparatus is used, it may be required to perform other operations such as switching relays for use by the vending machine.

Thus, a typical purchase will involve a number of power consuming steps, some of which take place simultaneously and others of which follow each other in quick succession. Normally, to improve customer satisfaction, acceptance and dispensing operations are driven at the highest speed compatible with avoiding jams.

Referring once more to FIG. 3, the voltage is tapped at a point after the capacitor 76 and fed to an analog to digital converter 51 the digital output of which is supplied to the microprocessor 50. The analog to digital converter may additionally be sampling other signals, multiplexed together at its input.

Figure 6:
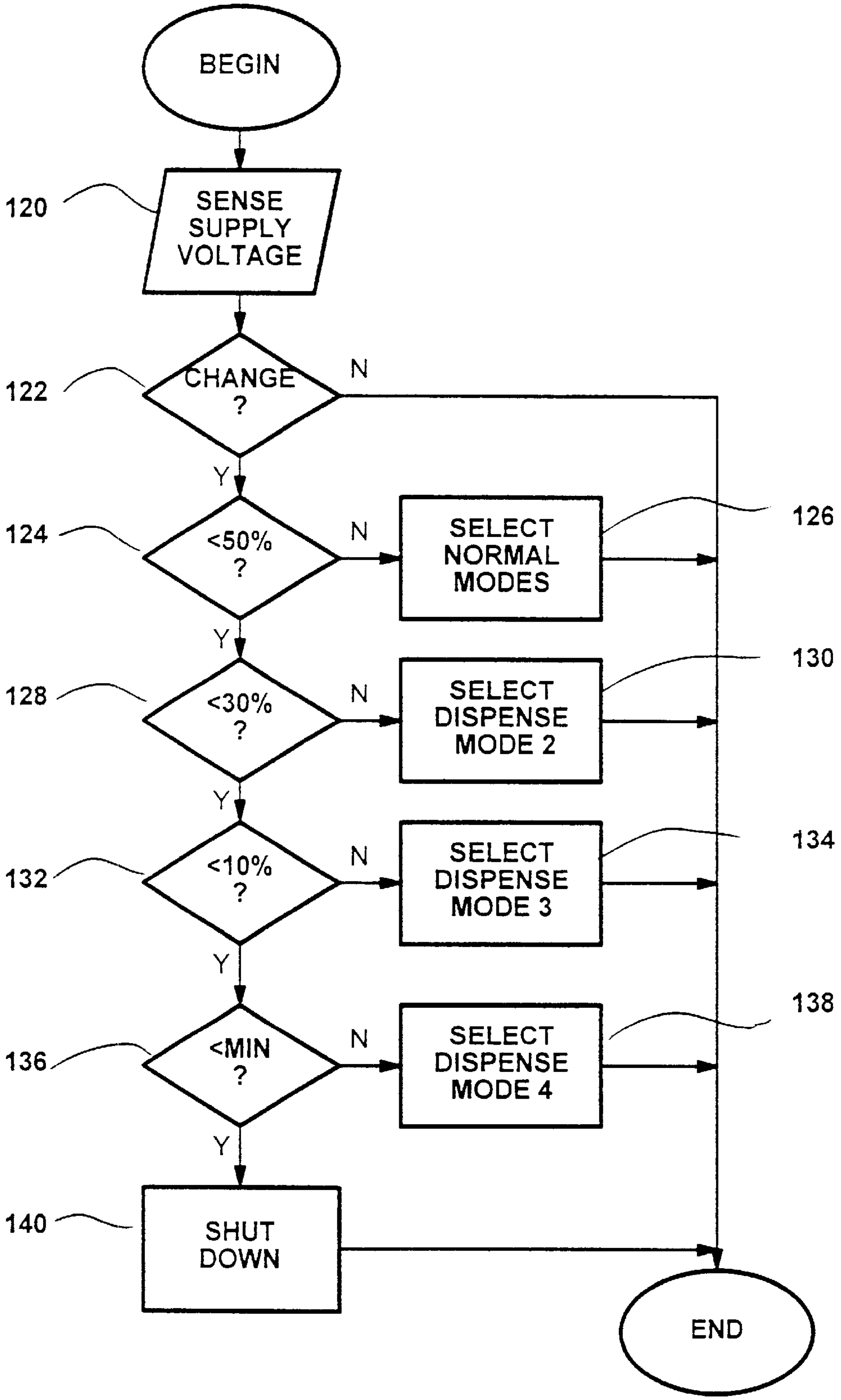
FIG. 6 is a flow diagram showing the process performed by the apparatus in a first embodiment, in determining one of a plurality of dispense modes based on available power.

Periodically (for example, several times a second) the microprocessor reads the analog to digital converter output, which therefore corresponds to the voltage over the capacitor 76, in a step 120 of FIG. 6. In a step 122, the microprocessor 50 determines whether there has been a change from the previous reading and, if not, no further action is taken in that cycle. If the power supply reading has changed, the microprocessor 50 proceeds to select one of a plurality of different operating modes in dependence upon the sensed power level, as follows.

In a step 124, the microprocessor 50 determines whether the voltage across the capacitor exceeds 50% of a reference value (corresponding to the nominal voltage on the interface) and, if so, normal operation mode is selected in step 126. In this mode, operation proceeds as described above and as known in the prior art.

Figure 8:
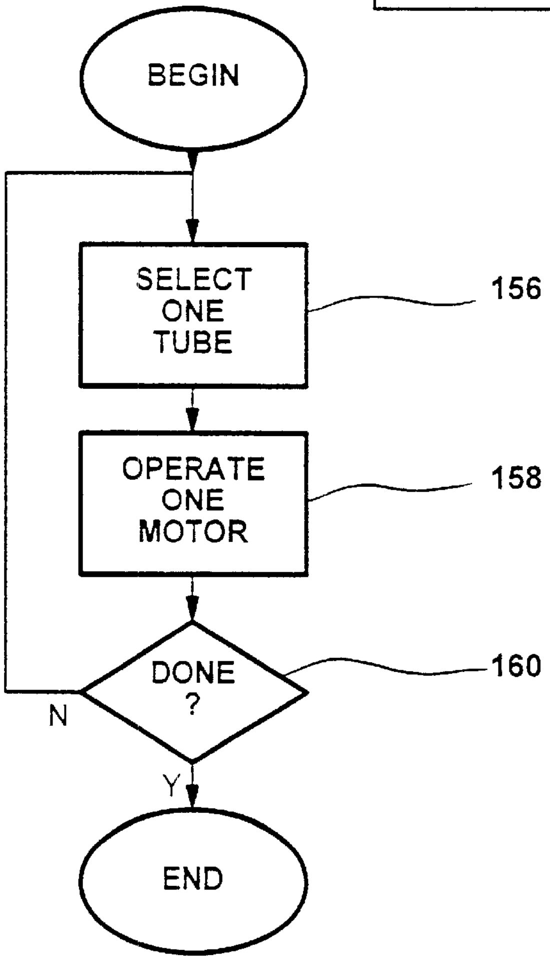
FIG. 8 is a flow diagram corresponding to that of FIG. 5 in a first reduced power mode of FIG. 6.

If the power is less than 50% of the reference value, then in step 128 the microprocessor 50 determines whether it exceeds 30% of the reference value and. if so, in a step 130 selects a second dispense mode (a reduced power mode), in which the process of FIG. 8 replaces that of FIG. 5.

Accordingly, in this second mode, for each dispense operation to be performed, the processor selects one tube at a time in step 156, and in step 158 energises the winding of one of the motors 292, 294 to dispense from the selected tube.

In step 160, the microprocessor determines whether all coins have been dispensed and, if not, returns to step 156.

It will therefore be apparent that in this mode, the instantaneous power during the dispense operation is lower since only one of the motors is energised at any time. The pay out speed is correspondingly slower, but this is less dissatisfying to a customer than total shutdown of the mechanism would be.

Returning to FIG. 6, if the sensed voltage was less than 30%, in a step 132, the microprocessor 50 tests whether it is greater than 10% of the reference value and, if so, in step 134, the microprocessor selects a third (reduced power) dispense mode for future dispenses.

Figure 9:
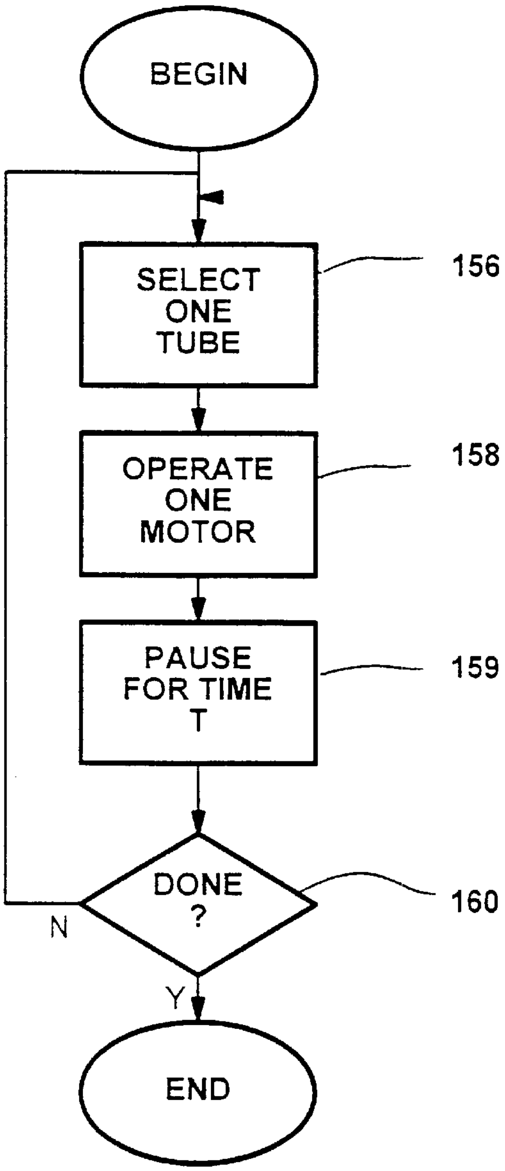
FIG. 9 is a flow diagram showing a second reduced power dispense mode.

The third dispense mode is illustrated in FIG. 9, in which steps 156, 158 and 160 have the same meaning as described in relation to FIG. 8 above. However, in the third mode, after operating a motor in step 158, the microprocessor 50 waits for a predetermined period T (related to the time constant, and hence capacitance, of the capacitor 76) before proceeding to step 160. Thus, in this mode, the apparatus pauses between dispenses for long enough for the capacitor 76 to re-charge fully or at least substantially, ensuring that energy from the capacitor is available for the next dispense operation.

Figure 10:
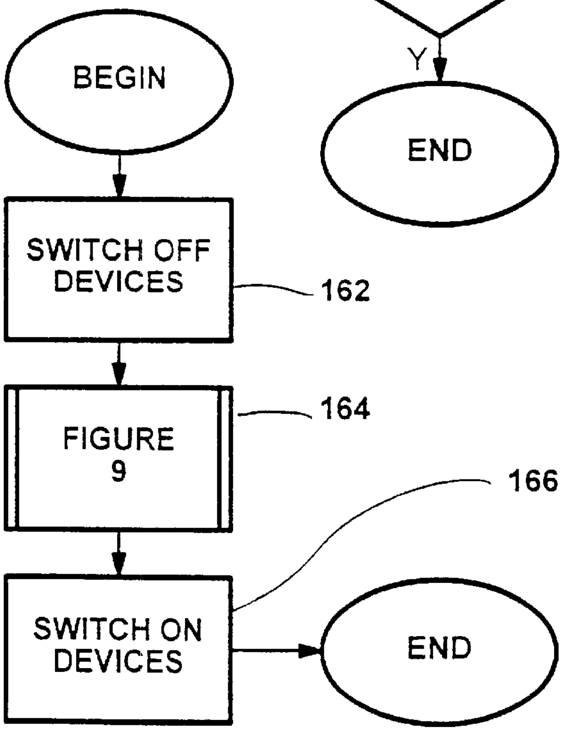
FIG. 10 is a flow diagram showing a third reduced power dispense mode.

If the power available is less than 10% but greater than a minimum threshold, as determined in step 136, then in step 138 the microprocessor selects a fourth dispense mode. The fourth dispense mode is shown in FIG. 10.

When a dispense is to take place, in a step 162 the microprocessor switches off the credit display 63, and any other peripheral devices within the input output circuitry 62 (for example, where an “exact change” relay is provided for the vending machine to show an “exact change only” light, this too is powered down).

In a step 164, the process of FIG. 9 is performed to dispense the required coins in change. In step 166, power is restored to the peripheral devices.

Typically, each of the peripheral devices concerned is provided on a separate printed circuit board, to which the power bus is routed, via a switch 82–88 controlled from the processor 50, so that power to each board can be switched out by the processor 50.

The foregoing description of FIGS. 6 and 8–10 describes the multiple modes of dispensing which are selected upon different power conditions.

Figure 7:
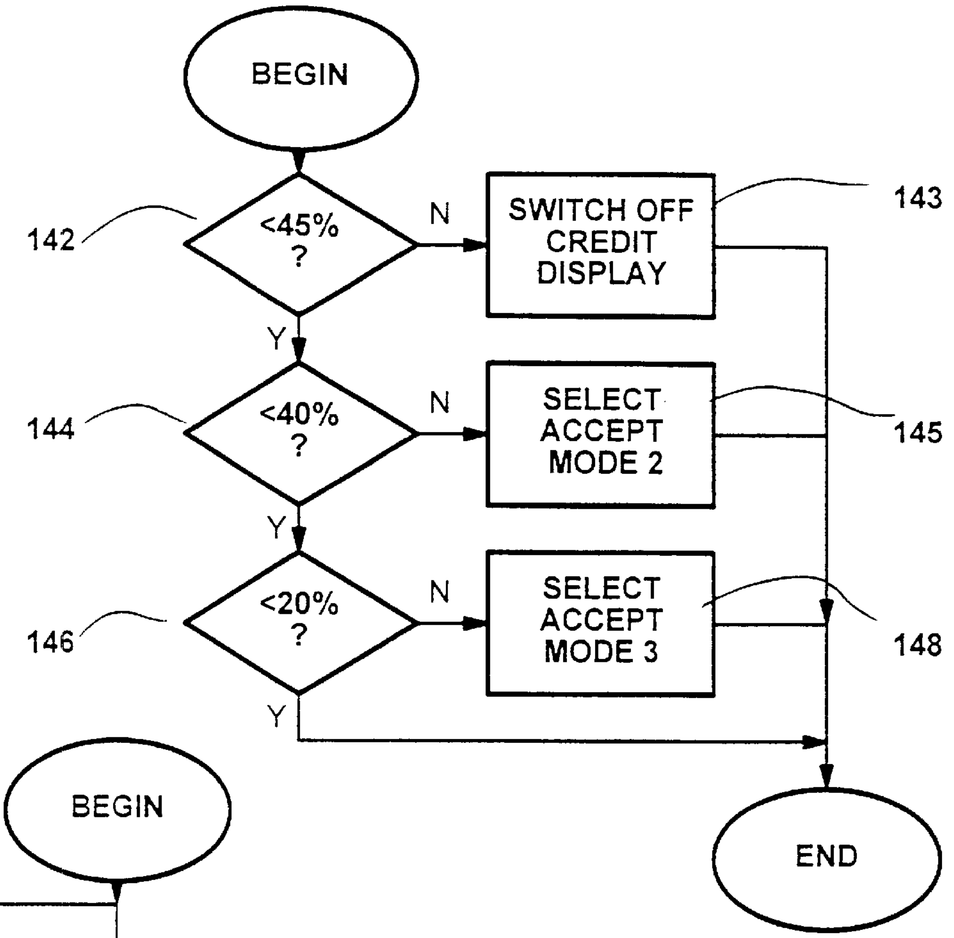
FIG. 7 is a flow diagram showing the operation of the apparatus in selecting an accept mode according to available power.

Equally, however, the present embodiment is able to make use of different modes of accepting coins. Accordingly, referring to FIG. 7, following the selection of a dispense mode according to the process of FIG. 6. in a step 142, the processor 50 determines whether the voltage over the capacitor 76 is greater than 45% of the stored reference value and, if so, switches off the power to the credit display 63.

Figure 11:
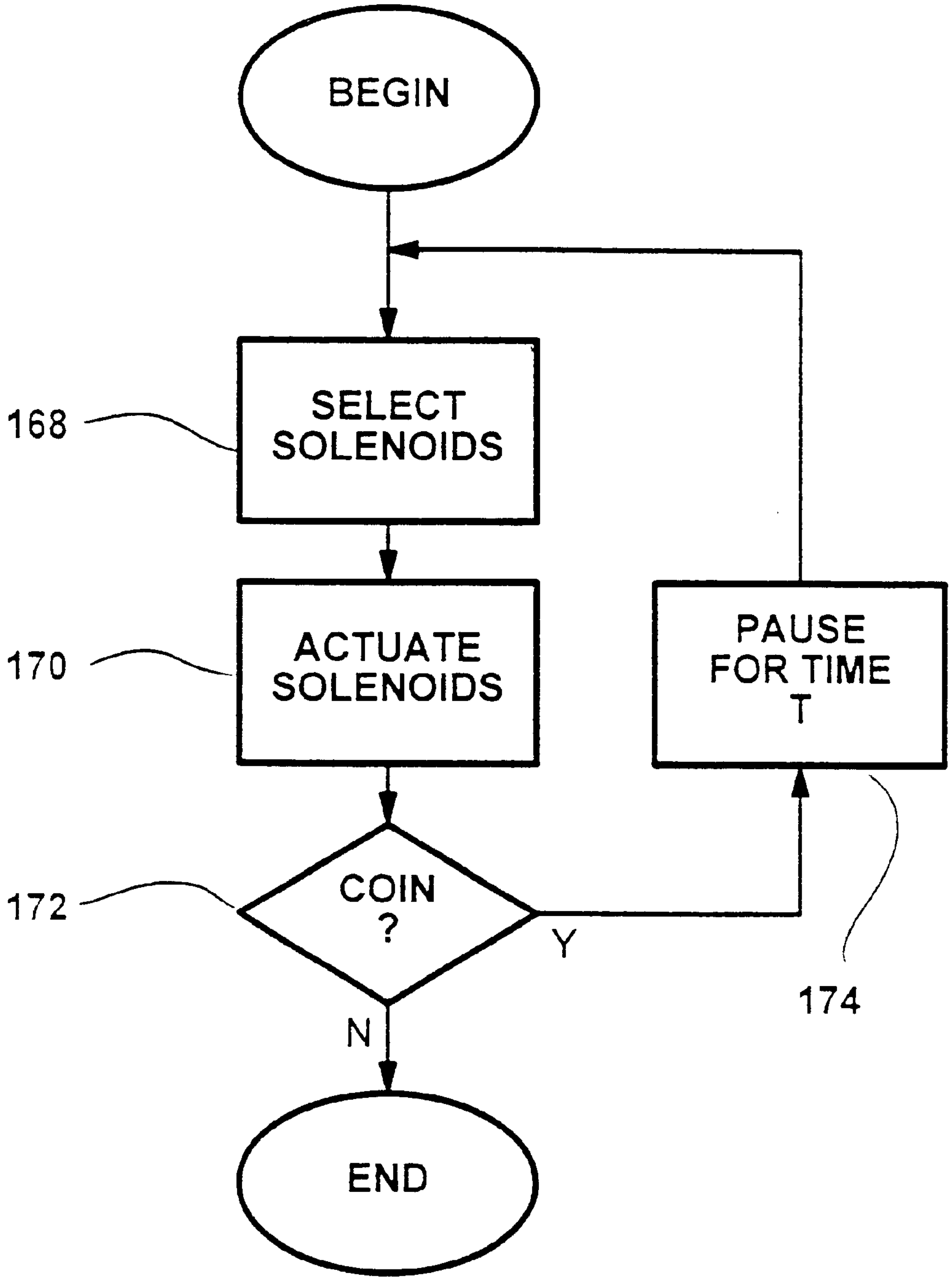
FIG. 11 is a flow diagram showing a first reduced power accept mode.

If the voltage is less than 45% but more than 40%, referring to FIG. 11, the microprocessor 50 selects a second acceptance mode in which, after selecting the solenoids to be actuated (e.g. the accept gate solenoid and one or more solenoids in the selector 10) in step 168, these solenoids are actuated in step 170. If a further coin is detected in step 172 by the sensing system, then in a step 174, the microprocessor waits a predetermined period of time T sufficient to allow the capacitor 76 to re-charge at least partially, before selecting the solenoids to be opened in step 168.

Thus, this corresponds to a slowing of the acceptance rate from some maximum rate corresponding to a minimum time between successive openings of the accept gate which is used in the normal acceptance mode, towards a slower acceptance rate used in the lower power mode. If a user introduces coins at intervals smaller than the predetermined time T, the accept gate 3 will be closed and the coins will be returned to the user, who can then subsequently re-insert them. There is therefore no increased risk of jamming or of loss of money to the user.

If the voltage over the capacitor is less than 40% but is detected in step 146 to be greater than 20% of the reference level then a third accept mode is selected in which the microprocessor 50 leaves a predetermined delay between the actuations of any power consuming device so that, for example, as disclosed with reference to FIG. 11, a predetermined time is allowed to elapse between subsequent acceptances of coins; then a predetermined time is allowed to elapse before firing relays such as a vend relay through switches 82–88; then a predetermined time is allowed to elapse before dispensing change commences, and then a predetermined time elapses between each successive dispensing operation.

Further Power Reduction Embodiments

The present invention provides a plurality of further power reduction options, useable separately or together, and with or without the above described embodiment.

Firstly, where the apparatus described above is designed for use in vending machines operating to more than one different interface standard and, specifically, where it can be used either with an electromechanical vending machine or a vending machine having the Multi-Drop Bus (MDB) MDB/ICP interface specified by the North American Vending Machines Association (NAMA) and the European Vending Machine Association (EVA), it may provide outputs (in the form of a credit display 63, and exact change relay, and other relays) which are not required for one of the interfaces (the MDB interface).

Accordingly, after each occasion when power is restored to the apparatus, it may determine which of several interfaces is present (e.g. by sensing on which interface the supply voltage is found) and the microprocessor 50 may switch off power to any peripheral devices not necessary for that interface. Thus, the overall power used by the apparatus may be reduced, without requiring tests of the power level supplied.

Where the dispenser mechanism makes use of the “hammer action” principle described in our earlier application GB 2274190, further particular measures may be adopted. Briefly, in that earlier application (incorporated herein by reference), when a jam is detected in the dispensing operation (for example, because the dispense motor has not reached a home sensor within a predetermined time period) the direction of motion of the jammed dispense actuator is reversed briefly and then reversed once more.

Figure 12:
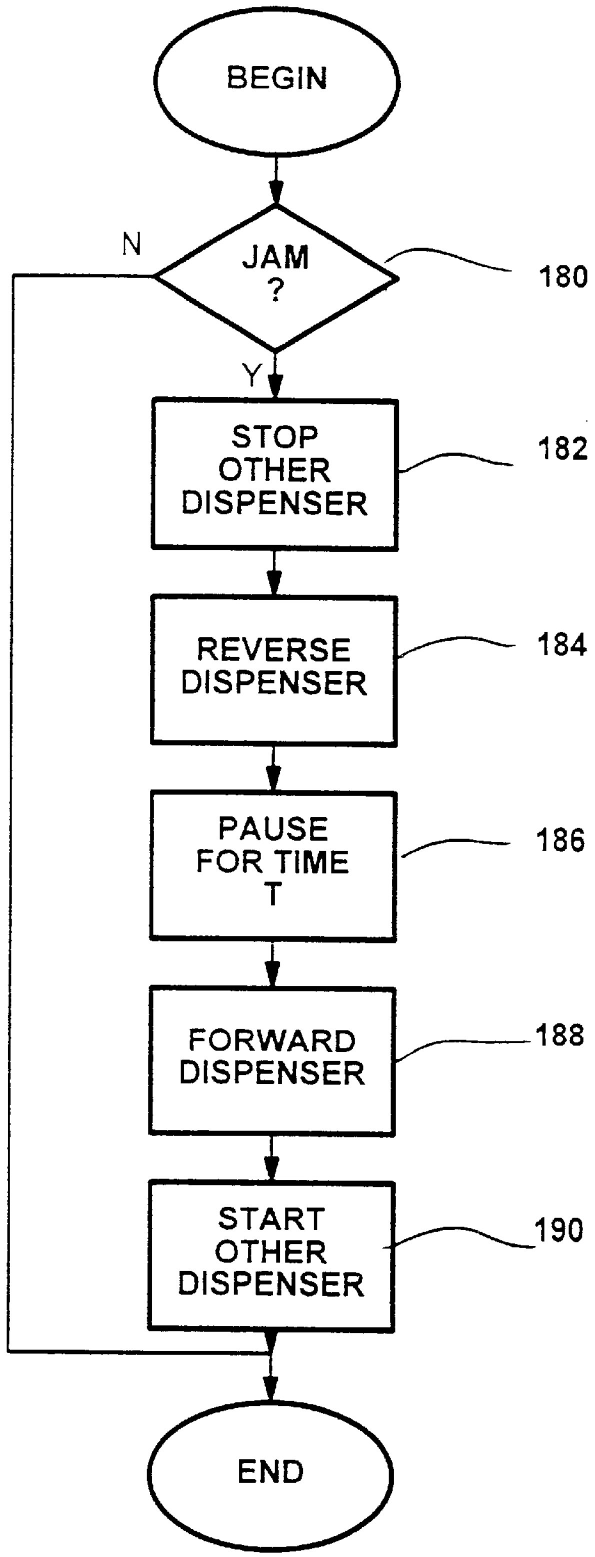
FIG. 12 is a flow diagram showing a further reduced power dispense mode according to a second embodiment of the invention.

According to a second embodiment of the present invention, referring to FIG. 12, in a reduced power mode, in a step 180 a jam is detected (for example as discussed above) in one of the dispense motors 292, 294 (for example the dispenser 292) and, in a step 182, the other dispenser (for example 294) is stopped within its dispensing operation.

In a step 184, the first dispenser 292 is reversed briefly, as disclosed in our above reference earlier application and, in a step 186, the microprocessor 50 waits a predetermined time T to allow the capacitor 76 to re-charge.

Next, in a step 188, the original forward dispensing motion of the first dispenser 292 is resumed, and on completion of its dispensing cycle, in a step 190 the second dispenser 294 is re-started to complete its own dispensing operation.

Thus, by way of contrast with our earlier application, according to the present embodiment the hammer action is enhanced in low power conditions by permitting the power supply capacitor 76 to recharge in the absence of other significant power drains, before resuming dispensing.

Other Variants And Modifications

The invention is not limited to the specific examples described above.

For example, it will be apparent that although coin mechanisms have been described, the invention could be used for mechanisms which accept or dispense tokens in the form of coins, or (with suitable changes to the above details) banknotes. Moreover, many aspects of the present embodiments could be used with other money handling apparatus such as card validators.

Each of the power reduction features described above could be utilised separate from the others, or in any sub-combination of the modes described above. Whilst sensing voltages has been described. it would of course be possible to sense current supplied through a load. Whilst energy storage on a capacitor has been described, it would equally be possible to use other means of storing energy.

Although sensing of actual power present has been described, it would also be possible to sense a prediction of the power likely to be available in addition to or as an alternative to, sensing a measure of the actual power as described above. For example, where the supply voltage is known to vary at predetermined times of the day, the microprocessor 50 may be arranged to enter a low power mode within those particular times, and may comprise for that purpose a real time clock.

Equally, where the supply voltage is known to vary from region to region (for example country to country) an input (for example using the operator actuated keypad) may be provided for inputting geographical region data, in response to which the microprocessor 50 may select a reduce power mode.

However, in general it is desirable that the apparatus should be capable of operating in normal, rather than reduced power, mode during at least most of the day entering reduced power mode only on exceptional supply voltage conditions.

Obviously, the thresholds indicated are purely by way of example and any suitable thresholds can be adopted, which are either absolute values or a percentages of a reference supply value. Whereas a predetermined time to recharge the capacitor has been indicated, it would be possible to provide for the calculation of a time to recharge the capacitor based on the measured supply voltage.

Whereas the description above illustrates switching off power to output devices such as relays or displays, in other embodiments it may be possible to selectively reduce the power supplied to those devices (for example to dim a display).

Various other modifications will be apparent to the person skilled in the art.

What is claimed is:

1. Cash handling apparatus comprising a power input and a money transport system for moving items of money in a normal operating mode in which the apparatus draws normal power from the power input, characterized by a power control system for detecting a probable reduced supply power level and, in dependence thereon, for selecting a reduced power mode in which said money transport system continues to function for future transactions, while said apparatus draws a lower power from said power input.

2. Apparatus according to claim 1, further comprising a power store charged from said power input, and from which power is available to one or more circuits of said apparatus.

3. Apparatus according to claim 2, in which the power control system is arranged, in a said reduced power mode, to create a delay greater than a predetermined period between successive operations of the or each said circuit.

4. Apparatus according to claim 2, in which said circuits include at least one actuator of said money transport system.

5. Apparatus according to claim 4, in which said actuator comprises a money dispense actuator.

6. Apparatus according to claim 5, in which said money dispense actuator is a coin dispense motor.

7. Apparatus according to claim 4, in which said actuator comprises a money accept actuator.

8. Apparatus according to claim 7, in which said money accept actuator comprises a coin accept gate.

9. Apparatus according to claim 7, in which said money accept actuator comprises a coin separator.

10. Apparatus according to claim 3, in which said circuits include a signal output relay for connection to an external apparatus.

11. Cash handling apparatus comprising a power input and a money transport system for moving items of money in a normal operating mode in which said apparatus draws normal power from said power unit, characterized by a power control system for detecting a probable reduced supply power level and, in dependence thereon, for selecting a reduced power mode in which said money transport system continues to function for future transactions, while said apparatus draws a lower power from said power input, and in which said money moving system comprises at least two actuators operating simultaneously in said normal mode, and said power control system is arranged to operate said actuators sequentially in said reduced power mode.

12. Cash handling apparatus comprising a power input and a money transport system for moving items of money in a normal operating mode in which said apparatus draws normal power from said power unit, characterized by a power control system for detecting a probable reduced supply power level and, in dependence thereon, for selecting a reduced power mode in which said money transport system continues to function for future transactions, while said apparatus draws a lower power from said power input, and further comprising one or more subsystems other than said money transport system, and in which said power control system is arranged to reduce power to said other subsystems.

13. Apparatus according to claim 12, in which said power control system is arranged to temporarily reduce power to said other subsystems during operation of said money transport system.

14. Cash handling apparatus comprising a power input and a money transport system for moving items of money in a normal operating mode in which said apparatus draws normal power from said power unit, characterized by a power control system for detecting a probable reduced supply power level and, in dependence thereon, for selecting a reduced power mode in which said money transport system continues to function for future transactions, while said apparatus draws a lower power from said power input, and in which said power control system is arranged to select one of a plurality of reduced power modes corresponding to successively lower power levels.

15. A method of operating a currency handling apparatus arranged to transport items of money, comprising providing a plurality of operating modes corresponding to successively lower peak power consumptions. in each of which modes the apparatus continues to transport items of money; detecting probable available power from an external power supply; and selecting one of said modes to match the available power.

16. The method of claim 15, further comprising sensing available power.

17. The method of claim 15, further comprising varying the money transport rate to vary the peak power consumed.

18. The method of claim 17, comprising varying the money payout rate to vary the peak power consumed.

19. The method of claim 17 comprising varying the money acceptance rate to vary the peak power consumed.

20. A method of operating a currency handling apparatus arranged to transport items of money, comprising detecting the available power from an external power supply; and varying the money transport rate to match the peak power consumed to the available power.

* * * * *